United States Patent
Ebrahimi Afrouzi

(10) Patent No.: US 11,543,792 B1
(45) Date of Patent: Jan. 3, 2023

(54) METHOD FOR DEVISING A SCHEDULE BASED ON USER INPUT

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 17/838,323

(22) Filed: Jun. 13, 2022

Related U.S. Application Data

(63) Continuation of application No. 16/667,206, filed on Oct. 29, 2019, now Pat. No. 11,442,422, which is a continuation of application No. 15/449,660, filed on Mar. 3, 2017, now Pat. No. 10,496,063.

(60) Provisional application No. 62/302,914, filed on Mar. 3, 2016.

(51) Int. Cl.
| | |
|---|---|
| *G06F 17/00* | (2019.01) |
| *G05B 19/042* | (2006.01) |
| *B25J 11/00* | (2006.01) |
| *B25J 9/16* | (2006.01) |
| *A47L 11/40* | (2006.01) |

(52) U.S. Cl.
CPC ...... *G05B 19/0426* (2013.01); *A47L 11/4011* (2013.01); *B25J 9/161* (2013.01); *B25J 11/0085* (2013.01); *A47L 2201/04* (2013.01); *G05B 2219/25419* (2013.01); *G05D 2201/0203* (2013.01)

(58) Field of Classification Search
CPC ...... G05B 19/0426; G05B 2219/25419; A47L 11/4011; A47L 2201/04; B25J 9/161; B25J 11/0085; G05D 2201/0203
USPC .......................................................... 700/257
See application file for complete search history.

(56) References Cited

U.S. PATENT DOCUMENTS

| | | | |
|---|---|---|---|
| 8,761,931 B2 * | 6/2014 | Halloran | A47L 11/4061 709/227 |
| 9,050,723 B1 * | 6/2015 | Elazary | G06F 11/0793 |
| 9,233,466 B2 * | 1/2016 | Skrinde | B25J 9/08 |
| 9,233,472 B2 * | 1/2016 | Angle | G06Q 10/1095 |
| 9,375,847 B2 * | 6/2016 | Angle | H04L 12/282 |
| 9,392,920 B2 * | 7/2016 | Halloran | B25J 9/0003 |
| 9,457,463 B2 * | 10/2016 | Tadayon | F24S 25/10 |
| 9,457,468 B1 * | 10/2016 | Elazary | B25J 9/161 |
| 9,486,924 B2 * | 11/2016 | Dubrovsky | G05D 1/0022 |
| 9,656,389 B2 * | 5/2017 | Skrinde | B25J 9/1661 |
| 9,802,322 B2 * | 10/2017 | Angle | G06Q 20/12 |
| 9,874,873 B2 * | 1/2018 | Angle | G05D 1/0022 |
| 10,071,891 B2 * | 9/2018 | High | A47F 10/04 |
| 10,130,232 B2 * | 11/2018 | Atchley | G01S 1/70 |
| 10,365,659 B2 * | 7/2019 | Park | B25J 9/16 |
| 10,624,516 B2 * | 4/2020 | Cudzilo | G05B 19/042 |
| 10,893,787 B2 * | 1/2021 | Dubrovsky | A47L 11/4011 |
| 11,020,860 B2 * | 6/2021 | Cheuvront | G07C 5/0808 |
| 2014/0207282 A1 * | 7/2014 | Angle | H04W 4/30 901/1 |
| 2014/0249671 A1 * | 9/2014 | Halloran | A47L 11/24 901/50 |
| 2015/0217443 A1 * | 8/2015 | Tadayon | F24S 50/20 901/41 |

(Continued)

*Primary Examiner* — Ronnie M Mancho

(57) ABSTRACT

Some aspects include a schedule development method for a robotic floor-cleaning device that recognizes patterns in user input to automatically devise a work schedule.

20 Claims, 1 Drawing Sheet

(56) References Cited

U.S. PATENT DOCUMENTS

| | | | |
|---|---|---|---|
| 2016/0082589 A1* | 3/2016 | Skrinde | B25J 9/1689 |
| | | | 700/255 |
| 2016/0167234 A1* | 6/2016 | Angle | G06Q 20/40 |
| | | | 701/2 |
| 2016/0334800 A1* | 11/2016 | Han | A47L 11/4011 |
| 2017/0164802 A1* | 6/2017 | Cudzilo | G06F 9/453 |
| 2017/0265703 A1* | 9/2017 | Park | B25J 9/16 |

* cited by examiner

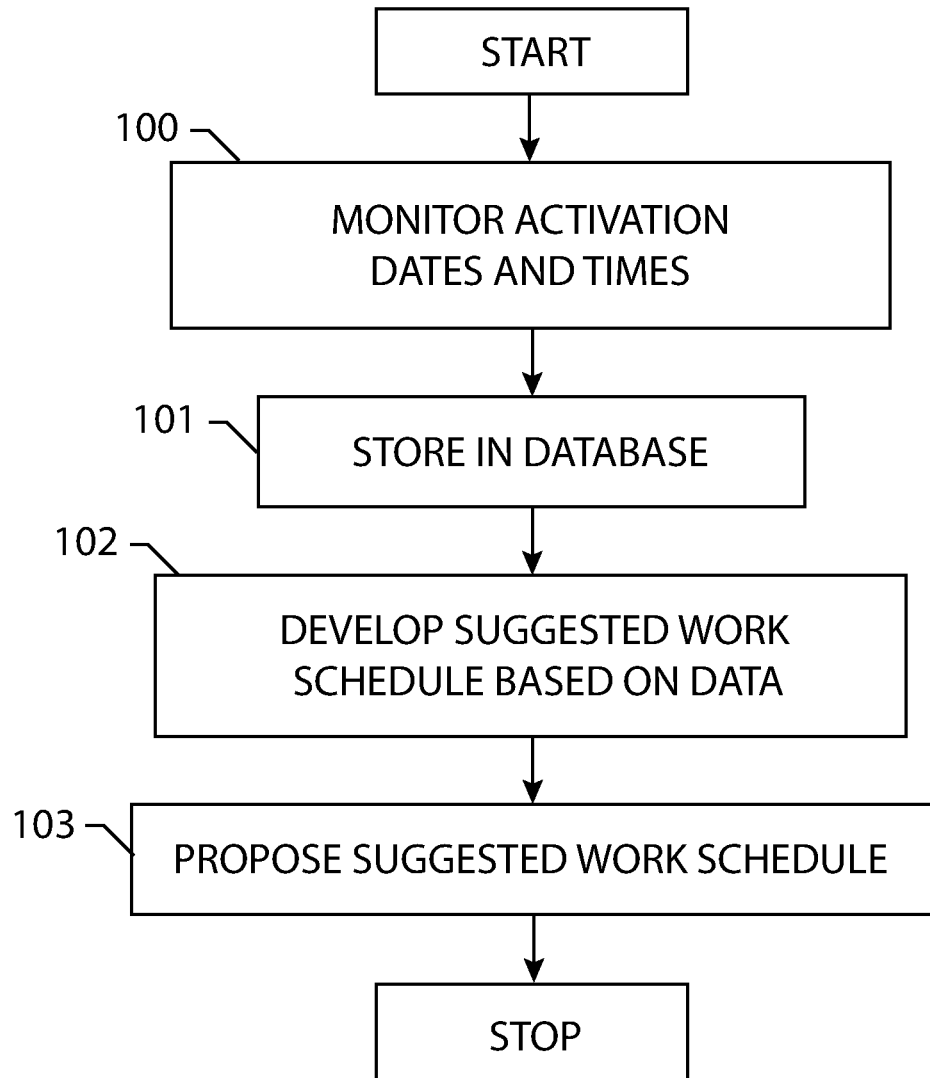

METHOD FOR DEVISING A SCHEDULE BASED ON USER INPUT

CROSS-REFERENCE TO RELATED APPLICATIONS

This application is a Continuation of U.S. Non-Provisional application Ser. No. 16/667,206, filed Oct. 29, 2019, which is a Continuation U.S. Non-Provisional patent application Ser. No. 15/449,660, filed Mar. 3, 2017, which claims the benefit of U.S. Provisional Patent Application No. 62/302,914, filed Mar. 3, 2016, each of which is hereby incorporated by reference.

FIELD OF THE DISCLOSURE

The disclosure relates to methods for devising schedules for robotic floor-cleaning devices based on historical data.

BACKGROUND

Robotic floor-cleaning devices may have scheduling systems that allow users to input schedules such that a robotic floor-cleaning device may turn on automatically at any preset time. Alternatively, a user may simply turn on a robotic floor-cleaning device to begin work at any time. Some users may benefit from a robotic floor-cleaning device that operates on a schedule but that does not require the user to take the time or energy to set up the schedule. A method for automatically devising a robotic floor-cleaning device work schedule based on user inputs may be beneficial.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments provide a schedule development method for a robotic floor-cleaning device that automatically devises a work schedule based on historical data. Some embodiments record user inputs indicating days and times to start work. Some embodiments develop a work schedule for future work based on the recorded inputs.

BRIEF DESCRIPTION OF DRAWINGS

FIG. 1 illustrates an example of a process for devising a suggested work schedule, according to some embodiments.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments disclose a robotic floor-cleaning device, including: a shell; a chassis; a set of wheels; at least one motor to drive the wheels and move the robotic floor-cleaning device in a direction on a surface; a control device to activate and control the robotic floor-cleaning device's movement, a clock, a memory unit to store data, an input/output means connected to the control unit and a cleaning unit connected to the chassis. In some embodiments, the control unit is configured to save a date and time set by a user when the robotic floor-cleaning device should be turned on. In some embodiments, the control unit is further configured to suggest a work schedule based on the saved data to the user using the input/output means.

Some embodiments disclose a method for setting a work schedule for a robotic floor-cleaning device including: monitoring use times of a robotic floor-cleaning device over a preset period of time; storing the times and dates the robotic floor-cleaning device was turned on in a database; developing a suggested work schedule based on the stored data; and proposing the suggested work schedule to users through an input/output device.

Some embodiments provide a method including: monitoring use times of a robotic floor-cleaning device over a preset period of time; storing the times and dates the robotic floor-cleaning device was turned on in a database; devising a suggested work schedule from the stored data using a machine learning technique; proposing the suggested work schedule to users through an input/output device; accepting user adjustments to the suggested work schedule through the input/output device; and adding the user adjustment data to the database for use in devising future work schedules.

One skilled in the art will appreciate that different embodiments of the invention may use different machine learning techniques such as, but not limited to, supervised learning, unsupervised learning, reinforcement learning, semi-supervised learning, etc.

In some embodiments, the input/output device may be wireless and may send and receive signals to and from remote devices, such as, for example, remote controls and smartphones.

In some embodiments, the floor-cleaning device may be scheduled directly via a user interface positioned thereon.

In some embodiments, inputs from a user and outputs from the robotic floor-cleaning device may be provided through a software application installed on an internet-connected device, such as a smartphone, a computer, or a tablet.

FIG. 1 illustrates an example of a process for devising a suggested work schedule, according to some embodiments. The process includes monitoring activation dates and times 100, storing the dates and times in a database 101, developing a suggested work schedule based on the stored data 102, and proposing the suggested work schedule 103.

In some embodiments, the suggested work schedule is developed based on times the robotic-floor cleaning device was turned on as per user-provided instruction. In some embodiments, the times the robotic-floor cleaning device was turned on is stored in a database. In some embodiments, the suggested work schedule is followed by the robotic floor-cleaning device after approval by the user of the suggested work schedule. In some embodiments, the suggested work schedule is developed based on data stored in the most recently updated database, wherein the database is continuously updated with new times the robotic-floor cleaning device was turned on.

In some embodiments, the suggested work schedule is developed based on the times the robotic-floor cleaning device was turned on that are stored in the database and using a start time that is the mean or median of the start times in the database, a start time that is the mean or median of a subset of the start times in the database, and/or using a machine learning algorithm to devise a work schedule based on the times in the database.

The invention claimed is:

1. A method for scheduling cleaning by a robotic floor-cleaning device, comprising:
providing, to a software application executed on an internet-connected device paired with the robotic floor-cleaning device, at least one input designating a new schedule or an adjustment to an existing schedule for operating the robotic floor-cleaning device;
receiving, with a control unit of the robotic floor-cleaning device, the new schedule or the adjustment to the existing schedule from the software application;
proposing, with the software application executed on the internet-connected device, a suggested schedule for operating the robotic floor-cleaning device comprising at least one date and time to a user;
providing, to the software application executed on the internet-connected device, at least one input designating approval of the suggested schedule; and
actuating, by the control unit of the robotic floor-cleaning device, the robotic floor-cleaning device to clean according to the new schedule or the adjustment to the existing schedule and the suggested schedule, wherein the control unit only actuates the robotic floor-cleaning device to clean according to the suggested schedule after approval of the suggested schedule.

2. The method of claim 1, wherein the suggested schedule is inferred using a machine learning algorithm.

3. The method of claim 2, wherein the machine learning algorithm uses at least a plurality of user inputs historically provided to the software application to infer the suggested schedule.

4. The method of claim 3, wherein the plurality of user inputs designates at least a plurality of schedules previously executed by the robotic floor-cleaning device at a particular past date and time specified in each of the plurality of schedules.

5. The method of claim 2, wherein the machine learning algorithm comprises reinforcement learning.

6. The method of claim 1, further comprising:
providing, to the software application executed on the internet-connected device, an adjustment to the suggested schedule;
receiving, by the control unit of the robotic floor-cleaning device, the adjusted suggested schedule from the software application; and
actuating, by the control unit of the robotic floor-cleaning device, the robotic floor-cleaning device to clean according to the adjusted suggested schedule.

7. The method of claim 1, wherein the internet-connected device comprises at least one of: a remote control, a smartphone, a computer, and a tablet.

8. The method of claim 1, further comprising:
receiving, by an interface of the robotic floor-cleaning device, a new schedule or an adjustment to an existing schedule for operating the robotic floor-cleaning device; and
receiving, by the control unit of the robotic floor-cleaning device, the new schedule or the adjustment to the existing schedule from the interface; and
actuating, by the control unit of the robotic floor-cleaning device, the robotic floor-cleaning device to clean according to the new schedule or the adjustment to the existing schedule.

9. A system for scheduling cleaning by a robotic floor-cleaning device, comprising:
a software application executed on an internet-connected device paired with the robotic floor-cleaning device configured to:
propose a suggested schedule for operating the robotic floor-cleaning device comprising at least one date and time to a user; and
receive at least one input designating a new schedule or an adjustment to an existing schedule and approval of the suggested schedule; and
the robotic floor-cleaning device, comprising:
a chassis;
a control unit;
a set of wheels coupled to the chassis and driven by at least one motor;
a control device for controlling movement of the robotic floor-cleaning device; and
a tangible, non-transitory, machine-readable medium storing instructions that when executed by the control unit of the robotic floor-cleaning device effectuate operations comprising:
receiving, with the control unit of the robotic floor-cleaning device, the new schedule or the adjustment to the existing schedule from the software application; and
actuating, by the control unit of the robotic floor-cleaning device, the robotic floor-cleaning device to clean according to the new schedule or the adjustment to the existing schedule and the suggested schedule, wherein the control unit only actuates the robotic floor-cleaning device to clean according to the suggested schedule after approval of the suggested schedule.

10. The system of claim 9, wherein the suggested schedule is inferred using a machine learning algorithm.

11. The system of claim 10, wherein the machine learning algorithm uses at least a plurality of user inputs historically provided to the software application to infer the suggested schedule.

12. The system of claim 11, wherein the plurality of user inputs designates at least a plurality of schedules previously executed by the robotic floor-cleaning device at a particular past date and time specified in each of the plurality of schedules.

13. The system of claim 10, wherein the machine learning algorithm comprises reinforcement learning.

14. The system of claim 9, wherein:
the software application executed on an internet-connected device is further configured to:
receive at least one input designating an adjustment to the suggested schedule; and
the operations further comprise:
receiving, by the control unit of the robotic floor-cleaning device, the adjusted suggested schedule from the software application; and actuating, by the control unit of the robotic floor-cleaning device, the robotic floor-cleaning device to clean according to the adjusted suggested schedule.

15. The system of claim 9, wherein the internet-connected device comprises at least one of: a remote control, a smartphone, a computer, and a tablet.

16. The system of claim 9, wherein the operations further comprise:
receiving, by an interface of the robotic floor-cleaning device, a new schedule or an adjustment to an existing schedule for operating the robotic floor-cleaning device; and
receiving, by the control unit of the robotic floor-cleaning device, the new schedule or the adjustment to the existing schedule from the interface; and
actuating, by the control unit of the robotic floor-cleaning device, the robotic floor-cleaning device to clean according to the new schedule or the adjustment to the existing schedule.

17. A robotic floor-cleaning device, comprising:
a chassis;
a set of wheels coupled to the chassis and driven by at least one motor;
a control unit;
a cleaning unit;
a control device for controlling movement of the robotic floor-cleaning device; and
a tangible, non-transitory, machine-readable medium storing instructions that when executed by the control unit of the robotic floor-cleaning device effectuate operations comprising:
receiving, with the control unit of the robotic floor-cleaning device, a new schedule or an adjustment to an existing schedule from a software application executed on an internet-connected device paired with the robotic floor-cleaning device; and
actuating, by the control unit of the robotic floor-cleaning device, the robotic floor-cleaning device to clean according to the new schedule or the adjustment to the existing schedule and a suggested schedule, wherein the control unit only actuates the robotic floor-cleaning device to clean according to the suggested schedule after approval of the suggested schedule;
wherein the software application executed on the internet-connected device is configured to:
propose the suggested schedule for operating the robotic floor-cleaning device comprising at least one date and time to a user; and
receive at least one input designating the new schedule or the adjustment to the existing schedule and approval of the suggested schedule.

18. The robotic floor-cleaning device of claim 17, wherein the suggested schedule is inferred using a machine learning algorithm.

19. The robotic floor-cleaning device of claim 18, wherein the machine learning algorithm uses at least a plurality of user inputs historically provided to the software application to infer the suggested schedule, wherein the plurality of user inputs designates at least a plurality of schedules previously executed by the robotic floor-cleaning device at a particular past date and time specified in each of the plurality of schedules.

20. A tangible, non-transitory, machine-readable medium storing instructions that when executed by a control unit of a robotic floor-cleaning device effectuate operations comprising:
receiving, with the control unit of the robotic floor-cleaning device, a new schedule or an adjustment to an existing schedule from a software application executed on an internet-connected device paired with the robotic floor-cleaning device; and
actuating, by the control unit of the robotic floor-cleaning device, the robotic floor-cleaning device to clean according to the new schedule or the adjustment to the existing schedule and a suggested schedule, wherein the control unit only actuates the robotic floor-cleaning device to clean according to the suggested schedule after approval of the suggested schedule;
wherein the software application executed on the internet-connected device is configured to:
propose the suggested schedule for operating the robotic floor-cleaning device comprising at least one date and time to a user; and
receive at least one input designating the new schedule or the adjustment to the existing schedule and approval of the suggested schedule.

* * * * *